Dec. 24, 1957  J. E. KUBACKA ET AL  2,817,558
ROOF RAIL WEATHER STRIP FOR CONVERTIBLE TYPE DOORS
Filed Jan. 7, 1955

INVENTORS
Alfons A. Limberg &
BY Joseph E. Kubacka
Paul Fitzpatrick
ATTORNEY

United States Patent Office 2,817,558
Patented Dec. 24, 1957

2,817,558

ROOF RAIL WEATHER STRIP FOR CONVERTIBLE TYPE DOORS

Joseph E. Kubacka, Birmingham, and Alfons A. Limberg, Grosse Pointe, Mich., assignors to General Motors Corporation, Detroit, Mich., a corporation of Delaware Application January 7, 1955, Serial No. 480,480

6 Claims. (Cl. 296—44)

This invention relates to a weatherstrip, and more particularly to a roof rail weatherstrip for an automobile having a convertible type door.

In certain types of automobile bodies, the doors are of the so-called "convertible" type and do not have a frame extending around the door window opening. In these bodies the weatherstrip for sealing the window opening is located between the side roof rail of the automobile and the top edge of each door window. It has been the general practice to provide a resilient weatherstrip of rubber or the like secured to the bottom of the side roof rail and adapted to engage the top edge of the window when the window is in raised position. However, in automobile bodies having convertible type doors a problem has existed in that the weatherstrip must provide a seal when the window moves upwardly, as when the window is run up while the door is closed, and also when the window swings inwardly, as when the door is slammed shut while the window is in raised position. In addition to providing a tight seal under these varying conditions of operation it is highly desirable from cost and assembly standpoints that the weatherstrip should have a constant transverse section along the entire length of the automobile side roof rail.

The improved weatherstrip disclosed and claimed herein provides a tight seal under the varying conditions of operation described above whether the top edge of the window engages the weatherstrip upon upward movement of the window or upon inward swinging movement thereof. This weatherstrip may be formed of constant transverse section along the entire length of the side roof rail even though it be used in a two-door automobile as illustrated in Figure 1 of the drawing, wherein the front door window may move upwardly into engagement with the weatherstrip or may swing inwardly into engagement with the weatherstrip, and wherein the rear window moves upwardly only. The weatherstrip may also be used in a four-door body wherein there are front and rear doors each without a peripheral window frame.

Another advantage of the improved weatherstrip is that the construction includes a rigid L-shaped stiffener embedded in the weatherstrip. The base of the weatherstrip is formed with spaced openings and the insert is offset in the area of each of these openings to lie in the plane of the outer surface of the base portion and provide means for securing the weatherstrip to the roof rail.

One feature of the invention is that it provides an improved weatherstrip particularly adapted for use as a side roof rail weatherstrip in an automobile having convertible type doors; another feature of the invention is that it provides a weatherstrip having a base with an integral flange projecting therefrom at one side and two lips projecting therefrom at the other side, one of the lips being engaged by the top edge of the window and being flexed to form a seal, and the other lip being spaced from and forming a shield over the top edge of the window; still another feature of the invention is that the weatherstrip includes an elongated rigid insert which is L-shaped in transverse section and is embedded in the base portion and flange of the weatherstrip; and yet another feature of the invention is that the base portion of the weatherstrip is formed with at least one opening therethrough and the insert is offset in the area of said opening to lie in the plane of the outer surface of said base portion to provide securing means for the weatherstrip.

Other features and advantages of the invention will be apparent from the following description and from the drawing, in which.

Figure 1:
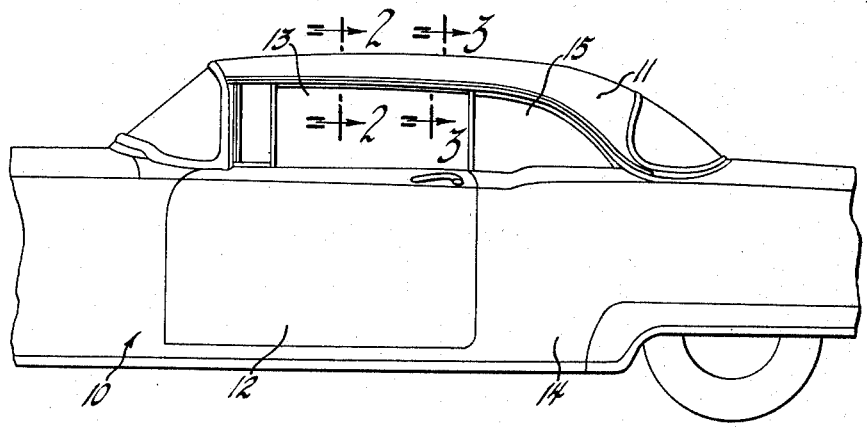
Figure 1 is a fragmentary side elevational view of an automobile having the improved weatherstrip thereon.

Referring now more particularly to the drawing, an automobile designated generally as 10 has a roof 11 and a door 12 provided with a vertically movable window 13. The door 12 is of the convertible type and has no peripheral frame for the window opening. Rearwardly of the door 12 the automobile has a rear quarter panel 14 above which there is a rear quarter window 15 which is movable vertically downward into the automobile body. As mentioned earlier, the weatherstrip disclosed herein is of constant transverse section throughout its entire length, being adaptable for use along the area of the door window and also along the area of the rear quarter window. Furthermore the weatherstrip may be used in an automobile body having front and rear convertible type doors, each without a peripheral frame for the window opening.

Figure 2:
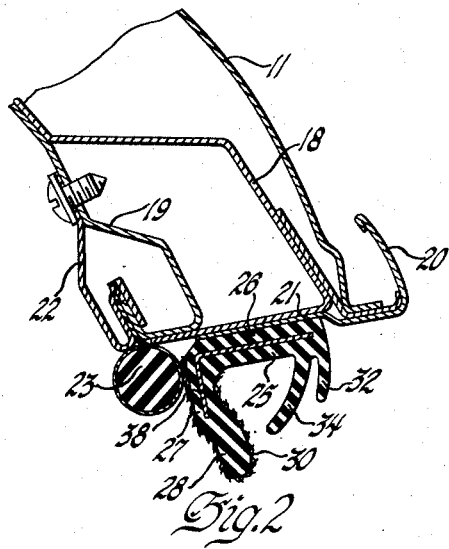
Figure 2 is an enlarged fragmentary section through the side roof rail along the line 2—2 of Figure 1, the automobile window being lowered.
Figure 3:
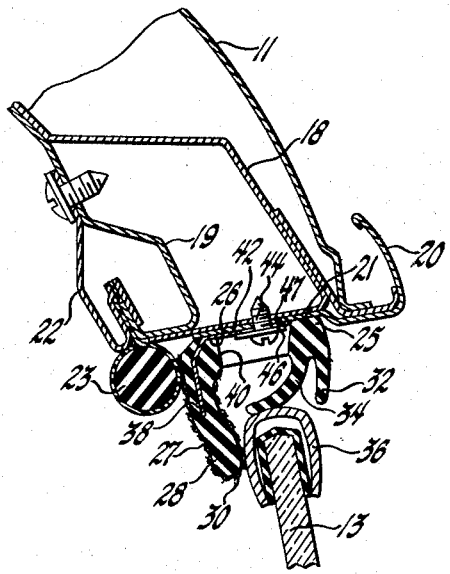
Figure 3 is a fragmentary transverse section through the side roof rail along the line 3—3 of Figure 1, the automobile window being raised.

As shown in Figures 2 and 3, there is a side roof rail which extends along the entire length of the automobile roof 11. This roof rail is formed as a box, including a channel member 18 having top, outside and bottom walls, the inner side of the roof rail being closed by an inner wall member 19 which may be welded to the channel 18. A rain gutter is formed along the edge of the roof by a gutter strip 20 having a flange 21 which extends under and is welded to the bottom surface of the lower wall of the channel member 18. On the inside of the body there is a trim strip 22 which is screwed to the roof rail member 19, and a conventional wind cord 23 is clamped between a turned flange on the trim strip 22 and a turned flange on the roof rail.

The improved weatherstrip is shown in Figures 2 and 3, Figure 2 showing the weatherstrip in unstressed condition when the window is lowered or the door is open and Figure 3 showing the weatherstrip in stressed or sealing condition when the window is raised and the door is closed. The weatherstrip, which is of constant transverse section along the entire edge of the roof, is preferably formed of rubber or the like and has a base 25 having a top surface 26 abutting the flange 21 of the drip gutter strip. Depending substantially at a right angle from the base 25 at the inner side thereof is a downwardly projecting flange 27 formed integrally with the base 25. The depending lower end portion 28 of the flange is offset in an outwardly direction so that it will be engaged and flexed by the window. The flange is covered by a skin 30 which may be formed integrally in the rubber itself or which may be formed by a cotton drill fabric or the like cemented to the rubber flange.

A first relatively short flexible lip 32 projects downwardly from the outer side of the base portion 25 in a direction generally parallel to the flange 27, the lip 32 curving toward the flange. A second longer lip 34 projects obliquely from the base 25 adjacent the first lip 32 and between said first lip and the flange 27. The second lip 34 curves toward the flange 27 and terminates short of said flange. When the weatherstrip is in its unflexed condition as shown in Figure 2, there is a small angle formed between the weatherstrips 32 and 34. When the trim strip 36 which is carried on the top of the window 13 engages the weatherstrip in sealing relation as shown in Figure 3, the outwardly offset portion 28 of the flange abuts the inner side of the trim strip 36 and this offset portion is deformed somewhat from its free portion so that a pressure seal is formed between the flange and the top edge of the window. The lip 34 rides upon and is deflected by the top surface of the window so that a seal is formed along the top edge of the window. As may be seen in Figure 3, this seal is not merely a line seal but is a seal of substantial depth measured transversely of the window and weatherstrip. The use of a flexing or cantilever type weatherstrip as opposed to a compressible weatherstrip insures a seal along the entire length of the window despite some variations in the location of the weatherstrip.

Embedded in the base 25 and flange 27 is an elongated rigid insert 38, which is preferably formed of metal, and which acts as a stiffener for the weatherstrip and serves to prevent undesired deflection of the base and the stem portion of the flange. At spaced intervals along the length of the roof rail the base 25 of the weatherstrip is formed with openings 40, and in the area of these openings the insert 38 is offset upwardly as shown in Figure 3 at 42 to lie in the plane of the upper surface of the base portion 25 to provide means for securing the weatherstrip to the roof rail. Screws 44 and washers 46 extending through holes 47 in the offset portion of the insert 38 securely hold the weatherstrip on the roof rail. Since the screws and washers are seated upon the metal insert and are not seated upon the yieldable rubber of the weatherstrip, the location of the weatherstrip on the roof rail is securely fixed and the weatherstrip cannot move with reference to the rail as it would if the screws seated upon the yieldable rubber.

If the door 12 is slammed shut while the window 13 is raised, the short lip 32 will be initially engaged by the top of the window, but will snap back to its free position where it provides a shield over the top edge of the window.

While we have shown and described one embodiment of our invention it is capable of many modifications. Changes therefore in the construction and arrangement may be made without departing from the spirit and scope of the invention as set forth in the appended claims.

We claim:

1. An elongated weatherstrip of the character described, including: a base portion; an integral flange projecting at an angle from said base portion at one side thereof; a first flexible lip projecting from the other side of said base portion, said lip extending in a direction generally parallel to said flange when the weatherstrip is unstressed and curving toward said flange; and a second flexible lip projecting obliquely from said base portion adjacent said first lip between said first lip and flange, said second lip being longer than said first lip and curving toward said flange and terminating short thereof.

2. A weatherstrip of the character claimed in claim 1, wherein the depending end portion of said flange is offset in a direction toward said lips.

3. An elongated weatherstrip of the character described, including: a flexible base portion; an integral flange projecting at substantially a right angle from said base portion at one side thereof; at least one flexible lip projecting from said base portion adjacent the other side thereof; and an elongated rigid insert which is L-shaped in transverse section and is embedded in said base portion and flange, a portion of said insert being offset to lie in the plane of the outer surface of said base portion to receive securing means for said weatherstrip.

4. A roof rail weatherstrip for an automobile, including: an elongated rubber base portion adapted to be secured to the roof rail of an automobile; an integral flange projecting downwardly from said base portion at one side thereof; a first flexible lip projecting downwardly from the other side of said base portion, said lip extending in a direction generally parallel to said flange when the weatherstrip is unstressed and curving toward said flange; a second flexible lip projecting downwardly from said base portion adjacent said first lip between said first lip and flange, said second lip being longer than said first lip and curving toward said flange and terminating short thereof, said second lip being flexed upwardly upon engagement under pressure with the top edge of an upwardly or inwardly movable automobile window, and said first lip being spaced from and forming a shield under the top edge of said window; and means for securing the upper side of said base portion to the roof rail.

5. A roof rail weatherstrip for an automobile, including: an elongated base portion adapted to be secured to the roof rail of an automobile; an integral flange projecting downwardly at substantially a right angle from said base portion at one side thereof; a first flexible lip projecting downwardly from the other side of said base portion in a direction generally parallel to said flange; a second flexible lip projecting downwardly from said base portion adjacent said first lip between said first lip and flange, said second lip extending obliquely from the base toward said flange and terminating short thereof, said second lip being flexed upwardly upon engagement under pressure with the top edge of an upwardly or inwardly movable automobile window, and said first lip being spaced from and forming a shield over the top edge of said window; and an elongated rigid metal insert which is L-shaped in transverse section and is embedded in said base portion and flange, said insert having offset portions for seating means for securing the upper side of said base portion of the weatherstrip to the roof rail.

6. A roof rail weatherstrip for an automobile, including: an elongated rubber base portion adapted to be secured to the roof rail of an automobile; an integral flange projecting downwardly from said base portion at one side thereof; a first flexible lip projecting downwardly from the other side of said base portion in a direction generally parallel to said flange and curving toward said flange; a second flexible lip projecting downwardly from said base portion adjacent said first lip between said first lip and flange, said second lip being longer than said first lip and curving toward said flange and terminating short thereof, said second lip being flexed upwardly upon engagement under pressure with the top edge of an upwardly or inwardly movable automobile window, and said first lip being spaced from and forming a shield over the top edge of said window; and an elongated rigid metal insert which is L-shaped in transverse section and is embedded in said base portion and flange, said base portion being formed with at least one opening therethrough and said insert being offset in the area of said opening to lie in the plane of the upper surface of said base portion to receive means for securing the upper side of said base portion to the roof rail.

References Cited in the file of this patent

UNITED STATES PATENTS

| | | |
|---|---|---|
| 1,804,799 | Palenske et al. | May 12, 1931 |
| 2,649,329 | Bratton | Aug. 18, 1953 |
| 2,671,935 | Flues | Mar. 16, 1954 |

FOREIGN PATENTS

| | | |
|---|---|---|
| 634,860 | Germany | Sept. 5, 1936 |
| 725,374 | Germany | Sept. 21, 1942 |